United States Patent
Hunt et al.

(10) Patent No.: US 7,209,124 B2
(45) Date of Patent: Apr. 24, 2007

(54) MULTIPLE-POSITION DOCKING STATION FOR A TABLET PERSONAL COMPUTER

(75) Inventors: Peter D. Hunt, Spring, TX (US); Pablo Salazar, Spring, TX (US); Mark Baerenstecher, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 10/214,827

(22) Filed: Aug. 8, 2002

(65) Prior Publication Data
US 2004/0027337 A1   Feb. 12, 2004

(51) Int. Cl.
*G09G 5/00*   (2006.01)

(52) U.S. Cl. .................. 345/173; 345/168; 345/179

(58) Field of Classification Search ............ 345/168, 345/173, 156, 179; 361/686, 680, 683, 724, 361/685; 395/281
See application file for complete search history.

(56) References Cited

U.S. PATENT DOCUMENTS

| | | | |
|---|---|---|---|
| 4,542,377 A | | 9/1985 | Hagen et al. |
| 4,831,368 A | | 5/1989 | Masimo et al. |
| 5,134,390 A | | 7/1992 | Kishimoto et al. |
| D343,168 S | | 1/1994 | Morisaki et al. |
| 5,329,289 A | | 7/1994 | Sakamoto et al. |
| 5,337,212 A | | 8/1994 | Bartlett et al. |
| 5,535,093 A | * | 7/1996 | Noguchi et al. ............ 361/686 |
| 5,708,561 A | | 1/1998 | Huilgol et al. |
| 5,774,233 A | | 6/1998 | Sakamoto |
| 5,841,424 A | * | 11/1998 | Kikinis ........................ 345/168 |
| 5,859,628 A | * | 1/1999 | Ross et al. ................... 345/173 |
| 5,889,964 A | * | 3/1999 | Cho et al. .................... 710/304 |
| 5,899,421 A | | 5/1999 | Silverman |
| 5,923,528 A | | 7/1999 | Lee |
| 5,941,493 A | | 8/1999 | Cheng |
| 5,973,664 A | | 10/1999 | Badger et al. |
| 6,061,104 A | | 5/2000 | Evanicky et al. |
| 6,137,468 A | | 10/2000 | Martinez et al. |
| 6,189,850 B1 | | 2/2001 | Liao et al. |
| 6,326,978 B1 | | 12/2001 | Robbins |
| 6,331,867 B1 | | 12/2001 | Eberhard et al. |
| 6,343,006 B1 | | 1/2002 | Moscovitch et al. |
| 6,366,450 B1 | * | 4/2002 | Janicek ....................... 361/680 |
| 6,418,010 B1 | | 7/2002 | Sawyer |
| 6,426,872 B1 | * | 7/2002 | Sutton et al. ............... 361/686 |
| 6,437,975 B1 | | 8/2002 | Huang |
| 6,443,408 B1 | | 9/2002 | Hung |
| 6,477,588 B1 | * | 11/2002 | Yerazunis et al. ............ 710/13 |
| D469,091 S | | 1/2003 | Hasegawa et al. |
| 6,504,710 B2 | * | 1/2003 | Sutton et al. ............... 361/686 |
| 6,522,529 B1 | | 2/2003 | Huilgol et al. |
| 6,567,101 B1 | | 5/2003 | Thomas |
| 6,639,788 B1 | | 10/2003 | Liao et al. |

(Continued)

*Primary Examiner*—Albert Decady
*Assistant Examiner*—Fritz Alphonse

(57) ABSTRACT

The disclosed embodiments provide a multiple-position docking station for a tablet personal computing device. A different mode of operation of the tablet personal computing device is supported by different positions of the docking station. A first mode of operation may be supported when the tablet personal computing device is positioned to extend in a more or less perpendicular direction from a work surface. A second mode of operation may be supported when the tablet personal computing device is positioned so that it extends in a more or less parallel direction with respect to a work surface.

23 Claims, 5 Drawing Sheets

U.S. PATENT DOCUMENTS

| | | |
|---|---|---|
| 6,781,604 B2 * | 8/2004 | Poynter .................... 345/690 |
| 6,856,506 B2 | 2/2005 | Doherty et al. |
| 6,874,744 B2 | 4/2005 | Rawlings et al. |
| 6,888,532 B2 | 5/2005 | Wong et al. |
| 7,025,274 B2 * | 4/2006 | Solomon et al. ....... 235/472.01 |
| 7,089,487 B2 * | 8/2006 | Tsai ........................ 715/501.1 |
| 2002/0135977 A1 * | 9/2002 | Yin et al. ................... 361/686 |
| 2003/0222848 A1 * | 12/2003 | Solomon et al. ............ 345/156 |
| 2003/0234797 A1 | 12/2003 | Williams et al. |
| 2004/0017652 A1 | 1/2004 | Billington et al. |

* cited by examiner

MULTIPLE-POSITION DOCKING STATION FOR A TABLET PERSONAL COMPUTER

BACKGROUND OF THE INVENTION

1. Field of the Invention

This invention relates generally to providing increased versatility for a tablet personal computing device and, more particularly, to a multiple-position docking station that allows a user to use a tablet personal computing device in a different mode of operation depending on its position in the docking station.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to becoming more powerful, computers have also become more mobile than ever before over the past few years. Notebook or laptop PCs have been steadily increasing in power while their cases (or footprint) continue to get lighter and more portable.

Notebook or laptop PCs may typically be connected to a device known as a docking station, which provides a connection to external devices that are too bulky to be readily transported along with the notebook PC. For example, a user may take a notebook computer on a business trip or to a meeting and use it to record information. The user may then return to his/her office and connect the notebook PC to a docking station, which may be connected to a larger display device for easier viewing. In addition, the docking station may support connectivity to other types of devices such as a printer, keyboard or mouse. In this manner, the user may obtain the benefits of portability offered by a notebook PC while taking advantage of the typically more spacious and comfortable facilities offered by a classical non-portable computer workstation.

Another innovation in recent years has been the handheld PC. These ultra-small PCs have revolutionized productivity because they are highly mobile and provide such functions as wireless email connectivity and even internet browsing. Many handheld PCs are operated or controlled by a stylus or pen instead of a keyboard. Handheld PCs do not typically utilize a docking station, but they may exchange data or synchronize with larger, more powerful PCs. Using this feature, a user may take a handheld PC on a business trip or to a meeting and later return and synchronize the new data in the handheld PC with the user's larger, more powerful desktop or notebook computer.

In spite of these benefits, handheld PCs are not generally as powerful as their full-function desktop or notebook counterparts. Design considerations such as overall size, weight and heat dissipation prevent the use of the most powerful components (microprocessors, for example) in handheld PCs. These same design considerations prevent the use of large amounts of computer memory and other types of storage such as disk drives.

The tablet PC is an emerging type of personal computing device that is designed to incorporate the power of traditional desktop or notebook computers while offering many of the portability and simplicity features available in handheld PCs. For example, tablet PCs may incorporate an x86 compatible processor and a full-function operating system such as Windows XP Professional, which is available from Microsoft Corporation of Redmond, Wash. In addition, tablet PCs may incorporate advanced video graphics capabilities and large hard drive storage capacity. Tablet PCs may additionally incorporate these powerful features while providing the user with the natural simplicity of a pen- or stylus-based interface, such as the interface typically found on a handheld PC. The combination of power and simplicity afforded by tablet PCs will allow support of handwriting recognition, which will make it possible for users to take handwritten notes, create drawings or annotate documents then wirelessly share the information with others.

The combination of features potentially available in a tablet PC may facilitate a number of different operational modes. For example, a user may take advantage of the sophisticated graphical capabilities of the tablet PC by using the display of the tablet PC as a normal computer display or as a companion display in conjunction with a desktop monitor. In other circumstances, the user may use the pen-based capabilities of the tablet PC to perform tasks such as keeping notes in a meeting or performing handwriting recognition. A docking station that allows users to take full advantage of the benefits provided by a tablet PC device is desirable.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
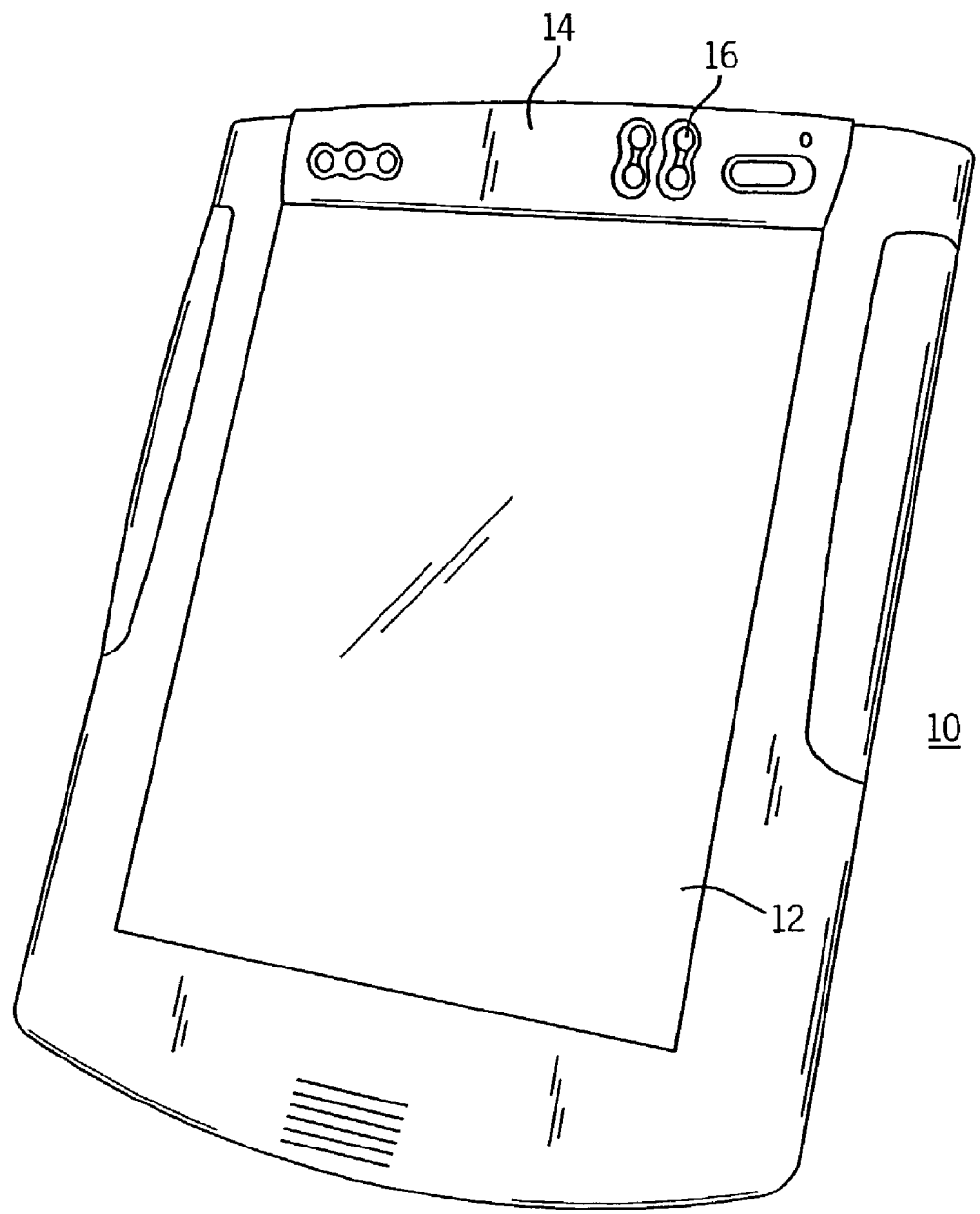
FIG. 1 is a perspective view showing the front of a tablet personal computing device.

Referring to the drawings, FIG. 1 is a perspective view showing the front of a tablet personal computing device. The tablet PC is referred to generally by the reference numeral 10. An x86 compatible processor and a full-function operating system, such as Windows XP (available from Microsoft Corporation of Redmond, Wash.) may be included in the tablet PC 10. In addition, the tablet PC 10 may include sophisticated graphics capability, a large amount of RAM and a large hard drive.

A video display screen 12 extends to cover a significant portion of the front of the tablet PC 10. In the illustrated embodiment, the video display 12 is touch-sensitive to facilitate handwriting recognition. The tablet PC 10 may include application software which supports handwriting recognition.

The tablet PC 10 and control panel 14, which may include an on-off switch and other control buttons. In addition, the control panel 14 is provided with a plurality of soft keys 16. The soft keys 16 may be programmed to support a wide variety of functions of the tablet PC 10. For example, the soft keys 16 may be programmed to allow a user to change the display mode of the tablet PC 10 or to access menus or other features associated with the operation of the tablet PC 10. As described below, the soft keys 16 may be used to enhance the operation of the tablet PC 10 when it is used in conjunction with a traditional desktop or notebook PC. The soft keys 16 may be programmable by the user or they may be pre-programmed by the manufacturer of the tablet PC 10. The specific functions performed by the soft keys 16 are not crucial aspects of the invention.

Figure 2:
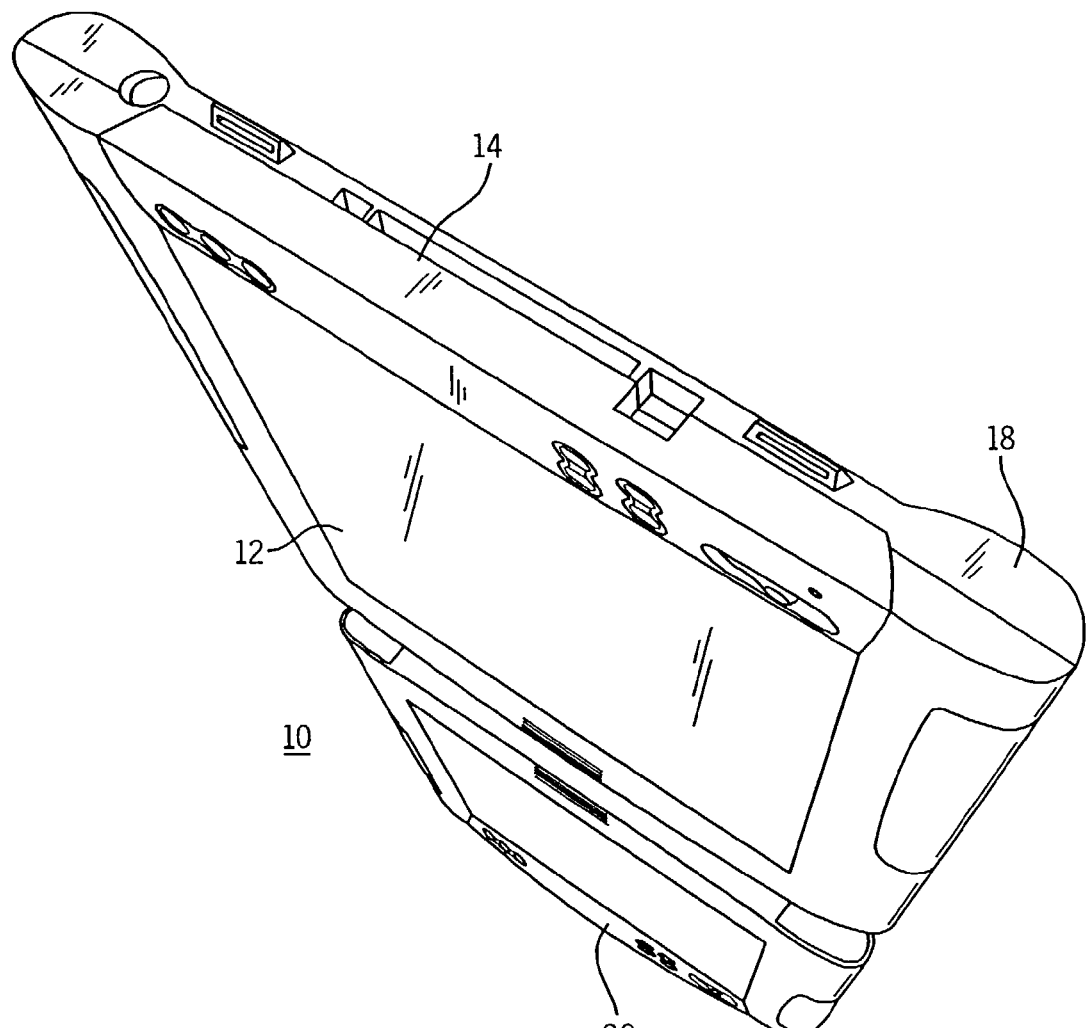
FIG. 2 is another perspective view of the tablet personal computing device shown in FIG. 1.

FIG. 2 is another perspective view of the tablet personal computing device shown in FIG. 1. The tablet PC 10 has a top edge 18, which may include a variety of different device connectors. For example, the top edge may provide access to a modem connector or an Ethernet connector.

In the disclosed embodiment, a docking connector 22 is disposed on the bottom edge of the tablet PC 10. The docking connector 20 includes electrical connections to the internal circuitry of the tablet PC 10. These electrical connections allow the exchange of information with another computing device such as a desktop or notebook PC when the tablet PC 10 is engaged in a docking station. The specific construction of the docking connector 22, including the signals carried thereon, is not a crucial aspect of the present invention.

Figure 3:
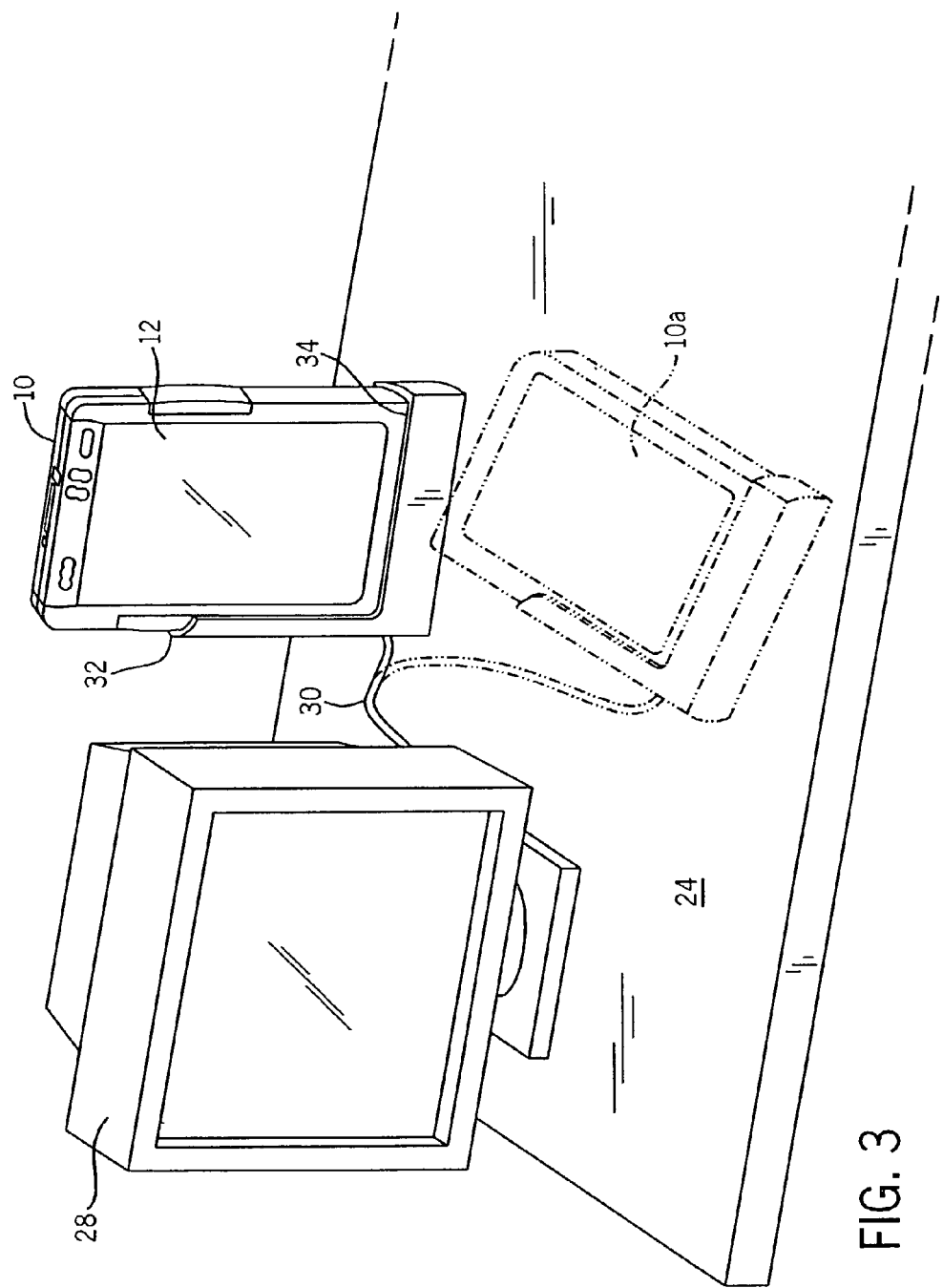
FIG. 3 is a perspective view of a computer workstation that includes a multiple-position docking station for a tablet personal computing device.

FIG. 3 is perspective views of a computer workstation including a multiple-position docking station for the tablet PC 10. The workstation is generally disposed on a work surface 24. The tablet PC 10 is disposed in a multi-position docking station 32. The docking station 32 is connected to a video display 28 by a video cable 30. The docking station 32 may additionally be used to connect the tablet PC 10 to other peripherals such as a keyboard or mouse, if desired.

The multiple-position docking station 32 is designed to allow a user to dock the tablet PC 10 in a first position, in which the tablet PC 10 extends in a generally perpendicular direction with respect to the work surface 24. The first position may be used to take advantage of the graphics capabilities of the tablet PC 10. Accordingly, the first position may be referred to as the "viewing position." The tablet PC 10 may automatically implement a first software configuration when it is docked in the first position in the docking station 32. That first software configuration may include, for example, setting configuration settings of the tablet PC 10, launching software applications, arranging the order in which data is displayed on the tablet PC 10 (or an associated display), designating the display of the tablet PC 10 (or an associated display) as the primary display device and/or the programming of functionality associated with the soft keys 16 (FIG. 2). The user is thus spared the task of having to manually configure the software settings corresponding to the first software configuration when the tablet PC 10 is placed in the docking station 32.

To dock the tablet PC in the viewing position, the tablet PC 10 is inserted into a docking cavity 34, which facilitates engagement of the docking connector 22 (FIG. 2) with a corresponding connector disposed within the first docking cavity 34. The docking station 32 includes a switch (described below with reference to FIG. 4) or other mechanism that detects insertion of the tablet PC 10 into the docking cavity 34. The state of this switch or other mechanism may be monitored by the OS of the tablet PC 10 and used to automatically initiate the first software configuration referred to above.

Even though the tablet PC 10 extends in a generally perpendicular direction from the work surface 24 in the first position, the angle between the tablet PC 10 and the work surface 24 may be greater or less than 90 degrees to facilitate easy viewing of the display 12. The angle at which the tablet PC 10 is disposed relative to the work surface 24 when docked in the first position is not a crucial aspect of the present invention.

When docked in the first position, the user is able to take full advantage of the sophisticated display capabilities of the tablet PC 10. Nonetheless, a user might find it difficult to take advantage of other features that rely extensively on the use of a pen or stylus, such as note taking or handwriting recognition, when the tablet PC 10 is disposed in the docking station 32 in the first position.

To take advantage of operational features that make use of a pen or stylus, a user may desire to move the tablet PC 10 and the multiple-position docking station 32 into a second position. In the illustrated embodiment, the user moves the tablet PC 10 into the second position by sliding the tablet PC 10 (still engaged in the docking station 32) into a position such that the table PC 10 is more or less parallel to and supported by the work surface 24. This second position is more comfortable for employing the pen- or stylus-based interface capabilities of the tablet PC 10. Accordingly, the second position may be referred to as the "inking position." The inking position is illustrated by the dashed lines shown in FIG. 3, with the tablet PC being referred to by the reference numeral 10a.

The tablet PC 10 may automatically implement a second software configuration when it is moved from the first position to the second position. That second software configuration may include, for example, setting configuration settings of the tablet PC 10, launching software applications, arranging the order in which data is displayed on the tablet PC 10 (or an associated display), designating the display of the tablet PC 10 (or an associated display) as the primary display device and/or the programming of functionality associated with the soft keys 16 (FIG. 2). The user is thus spared the task of having to manually configure the software settings corresponding to the second software configuration when the tablet PC 10 is moved from the first position into the second position.

The docking station 32 includes a mechanical switch (described below with reference to FIG. 4) or other mechanism that detects when the tablet PC 10 is slid into the second position (which may be referred to as an "inking position"). The state of this switch or other mechanism may be monitored by the OS of the tablet PC 10 and may be used to automatically initiate the second software configuration referred to above. The OS of the tablet PC 10 may monitor the switch to determine when the tablet PC 10 is returned from the second (or inking) position to the first (or viewing) position. The tablet PC 10 may be programmed to perform additional configuration actions, such as returning the software configuration of the tablet PC 10 to the first software configuration upon the return of the tablet PC 10 to the first (viewing) position.

In the inking position, the tablet PC 10a is substantially parallel to the work surface 24. Nonetheless there may be some angle other than 0 degrees between the work surface 24 and the tablet PC 10 when disposed in the inking position. The angle at which the tablet PC 10 is disposed relative to the work surface 24 in the inking position is not a crucial aspect of the present invention.

In an alternative embodiment, the docking station 32 may be equipped with a second docking cavity to be used to dispose the tablet PC 10 in the inking position. In this alternative embodiment, the tablet PC 10 may be removed from the first docking cavity and inserted into the second docking cavity to place the tablet PC 10 into inking position. In this embodiment, mechanical switches may be disposed in both docking cavities to detect the position of the tablet PC 10 and pass the position to the OS of the tablet PC 10.

When the tablet PC 10 is docked in the first (or viewing) position, the display 12 (FIG. 1) of the tablet PC 10 may be used in conjunction with the display 28, which is connected to the docking station 32. When the OS detects that the tablet PC 10 has been docked, the first software configuration is automatically initiated. The configuration settings invoked as part of the first software configuration may be customizable by the user of the tablet PC 10 or they may be programmed to be part of the operation of the tablet PC 10 by its manufacturer.

As an example of a set of actions that may comprise the first software configuration, the tablet PC 10 may be designated as the primary display and configured so that the applications that had been displayed on the display 12 are displayed on the display 28. Additionally, the tablet PC may launch an application to display a user's personal information when the tablet PC 10 is docked. Such applications are sometimes referred to as Personal Information Manager applications or "PIMs."

If the tablet PC 10 is operating a Windows operating system such as Windows XP and the display 28, a Windows Start menu may be displayed on the display 28 as part of the first software configuration. In this case, the display 12 may be referred to as the "current tablet view." The user of the tablet PC 10 may be able to mouse between the primary display 28 and the current tablet view on the display 12. Also, the user may employ a pen or stylus to operate the tablet PC 10 regardless of whether it is the primary display device or not.

The soft keys 16 (FIG. 1) may be programmed as part of the first soft configuration to allow the user to switch the contents of the display 12 with the contents of the display 28.

Additionally, the soft keys 16 (FIG. 1) may be programmed to invoke a menu display on the tablet PC 10. Examples of menu functions that may be invoked or controlled by the soft keys 16 are as follows: Set Current Tablet View, Go to Current Tablet View, Change Primary Display or Select Application Program. Those of ordinary skill in the art will appreciate that numerous other functions may be invoked or controlled by the soft keys 16. The specific definition of features invoked or controlled by the soft keys 16 is not a crucial aspect of the present invention.

When the user desires to use the tablet PC 10 for a function that takes full advantage of its pen- or stylus-based features, the tablet PC 10 may be moved to the second (or inking) position by sliding the tablet PC 10 and the docking station 32 to allow the tablet PC 10 to rest in a more or less parallel orientation and to be supported by the work surface 24. In the inking position, the tablet PC 10 is comfortably disposed for use of a pen or stylus, which may be used to facilitate handwriting recognition.

As described above, the tablet PC 10 may be programmed to automatically invoke a second software configuration when moved into the inking position. As part of that second software configuration, for example, the display 12 of the tablet PC 10 may automatically become the primary display. In a Windows environment, a Windows Start menu may automatically be invoked on the tablet PC 10 when it is moved into the inking position. Additionally, software applications on the tablet PC 10 may be launched or brought to the foreground and other configuration settings may be automatically invoked as part of the second software configuration when the tablet PC 10 is moved into the inking position.

If so desired, the user can move the tablet PC 10 from the inking position and return it to the viewing position. When this is done, the application currently running on the tablet PC may remain open and the display 28 may automatically be designated as the primary display. In a Windows environment, a Windows start menu may automatically be invoked on the display 28. The tablet PC 10 may be, for example, configured to assume another software configuration or to invoke the first software configuration when moved from the inking position to the viewing position.

When the tablet PC 10 is removed from the docking station 32, the application programs running on the tablet PC 10 may remain open. Additionally, the display of the tablet PC 10 may automatically be designated as the primary display.

In addition, the tablet PC 10 may be used as a companion to a traditional PC (not shown). If the tablet PC is used as a companion to a traditional PC, it may synchronize data with the traditional PC in a manner similar to a handheld computing device.

Figure 4:
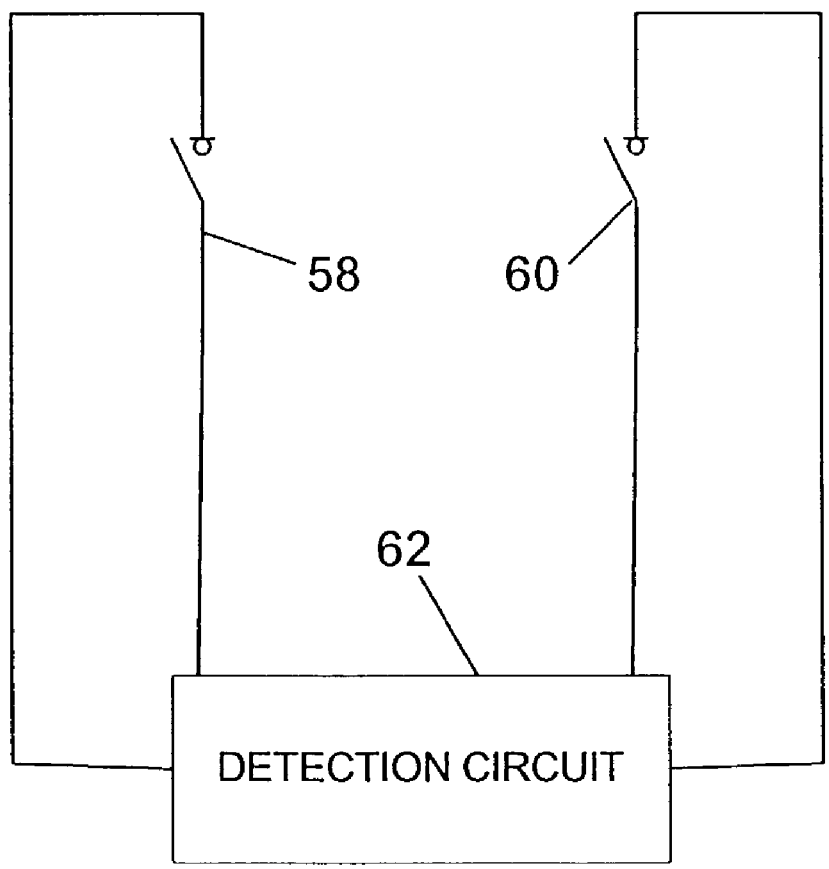
FIG. 4 is a schematic drawing of an example of detection circuitry that may be contained in a multiple-position docking station according to the present invention.

FIG. 4 is a schematic drawing of an example of detection circuitry that may be contained in a multiple-position docking station according to the present invention. The circuitry is generally referred to by the reference numeral 56. A first switch element 58 is positioned in the docking cavity 34 so that it is activated by the insertion of the tablet PC 10 within the docking cavity 34. A detection circuit 62 is connected to the switch 58 to detect when the switch 58 has closed. A second element 60 is disposed in the multiple-position docking station 32 in such a manner as to detect when the docking station has been moved from a first position (which may correspond to the viewing position discussed above) to a second position (which may correspond to the inking position discussed above). The switch element 60 may be a mercury switch or any other switch that is capable of detecting when the position of the docking station 32 has changed from a first position to a second position.

The detection circuit 62 may be constructed to automatically pass information it has detected about the status of the switches 58, 60 to the OS of the tablet PC 10. Alternatively, the OS of the tablet PC 10 may monitor the detection circuit 62 to detect when a switch has closed. The details of the switches 58, 60 and the detection circuit 62, including the switch types, are not crucial aspects of the present invention.

Figure 5:
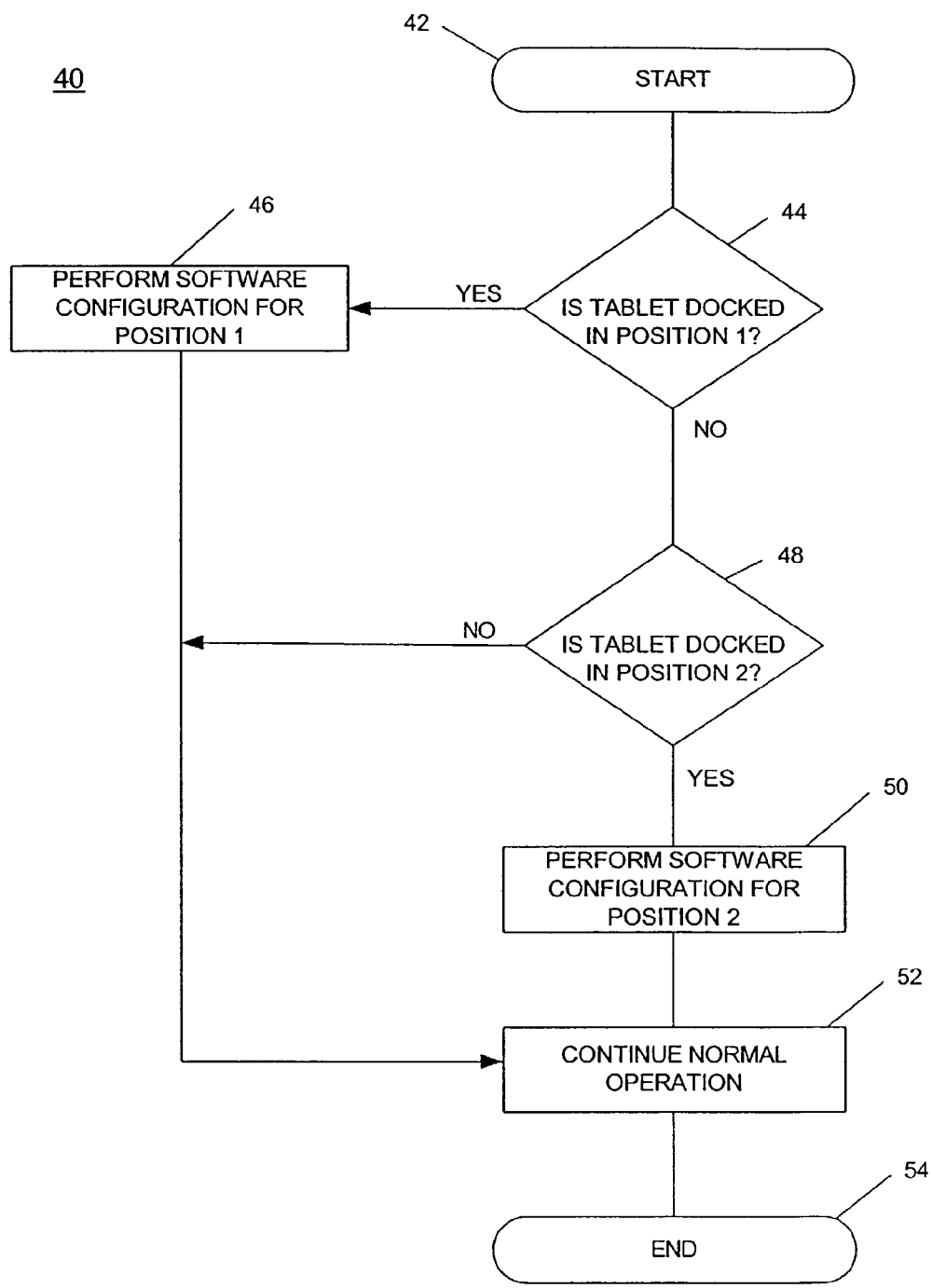
FIG. 5 is a process flow diagram illustrating the operation of an embodiment of the present invention.

FIG. 5 is a process flow diagram illustrating the operation of an embodiment of the present invention. The process is generally illustrated by the reference numeral 40. At 42, the process is initiated.

As set forth previously, the docking station 32 (FIG. 3) is equipped with a mechanical switch that is activated when the tablet PC 10 is docked in the docking cavity 34 of the docking station 32. The operating system of the tablet PC 10 is notified when the status of the mechanical switch indicates that the tablet PC 10 has been docked in the first (viewing) position. Alternatively, the operating system of the tablet PC 10 may be programmed to monitor the status of the switch to determine in of the tablet PC 10 has been docked in the docking station 32.

At decision 44, the operating system of the tablet PC 10 determines whether the tablet PC 10 has been docked in a first position. If so, the tablet PC 10 implements a predefined software configuration that is specifically designed for the operation of the tablet PC 10 in the first position at 46. For example, the first position may correspond to the viewing position previously discussed. In this case, the tablet PC may invoke a personal information manager (or PIM) or bring the PIM to the foreground of the display of the tablet PC 10 if the PIM is already running. The tablet PC may also configure its display settings to optimize the display 12 for viewing mode.

As previously set forth, the docking station 32 (FIG. 3) includes a mechanical switch that indicates when the tablet PC is moved into a second position such as the inking position previously discussed. The operating system of the tablet PC 10 is notified when the status of the mechanical switch indicates that the tablet PC 10 has been moved into a second position. Alternatively, the operating system of the tablet PC 10 may be programmed to monitor the status of the switch to determine if the tablet PC 10 has been moved into the second position.

At decision 46, the operating system of the tablet PC 10 determines whether the tablet PC 10 has been moved into the second position. If so, the tablet PC 10 implements a predefined software configuration that is specifically designed for the operation of the tablet PC 10 in the second position at 50. For example, the second position may correspond to the inking position previously discussed. In that case, the tablet PC may invoke a note taking program or a handwriting recognition program or bring one of those programs to the foreground of the display of the tablet PC 10 if the desired application is already running.

The tablet PC 10 need not be placed in the first position before transitioning to the second position. For example, the tablet PC 10 may be inserted into the docking cavity 34 of the docking station 32 in such a manner that the tablet PC 10 is initially detected in the second (inking) position. The order in which the positions are entered is not a crucial aspect of the present invention.

When the software configuration for the second position of the docking station 32 has concluded, normal operation of the tablet PC 10 continues, as shown at 52. The process concludes at 54.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A multiple-position docking station that co-operates with a computing device, comprising:
   a docking connector that is adapted to connect to the computing device;
   a mechanism that detects whether the computing device extends in a direction that is generally perpendicular or generally parallel to a work surface supporting the docking station; and
   wherein the computing device activates a handwriting recognition program in response to a determination that the computing device extends in a direction that is generally parallel to the work surface.

2. The multiple-position docking station of claim 1 wherein the computing device is a tablet PC.

3. The multiple-position docking station of claim 1 wherein the computing device designates a display of the computing device as a primary display in response to a determination that the computing device extends in a direction that is generally perpendicular to the work surface.

4. The multiple-position docking station of claim 3 wherein the computing device designates another display of a another computing device to which the computing device is docked as a secondary display.

5. The multiple-position docking station of claim 1 wherein the computing device launches a note taking program in response to a determination that the computing device extends in a direction that is generally parallel to the work surface.

6. The multiple-position docking station of claim 1 wherein the computing device configures at least one soft key to invoke a menu of display options in response to a signal from the mechanism.

7. The multiple-position docking station of claim 1 wherein the mechanism comprises a mercury switch.

8. The multiple-position docking station of claim 1 wherein the computing device remains in the same relative position with respect to the multiple-position docking station both when the computing device extends in the direction that is generally parallel to the work surface and when the computing device extends in the direction that is generally perpendicular to the work surface.

9. The multiple-position docking station of claim 1, wherein the docking station has an L-shape that covers a substantial portion of two edges of the computing device.

10. The multiple-position docking station of claim 1, wherein the docking station comprises a first docking cavity configured to receive the computing device when the computing device extends in the direction that is generally perpendicular to the work surface and a second docking cavity configured to receive the computing device when the computing device extends in the direction that is generally parallel to the work surface.

11. The multiple-position docking station of claim 1, wherein the direction that is generally perpendicular to the work surface is vertical.

12. A combination of a computing device and a multiple-position docking station, comprising:

a computing device having a screen;

a multiple-position docking station adapted to receive the computing device, the multiple-position docking station having a switch that indicates whether the screen of the computing device lies in a plane that is generally horizontal or generally vertical; and wherein the computing device is adapted to implement a first software configuration in response to an indication that the screen lies in a plane that is generally horizontal and wherein the computing device is adapted to implement a second software configuration in response to an indication that the screen lies in a plane that is generally vertical.

13. The combination of claim 12 wherein the computing device is a tablet PC.

14. The combination of claim 12 wherein the computing device launches a software application as part of the first software configuration.

15. The combination of claim 14 wherein the software application is a personal information manager application.

16. The combination of claim 12 wherein the computing device launches a software application as part of the second software configuration.

17. The combination of claim 16 wherein the software application is a handwriting recognition application.

18. The combination of claim 12 wherein the computing device configures the operation of at least one soft key as part of the first software configuration.

19. The combination of claim 12 wherein the computing device configures the operation of at least one soft key as part of the second software configuration.

20. The combination of claim 12 wherein the computing device remains in the same relative position with respect to the multiple-position docking station in the first position and the second position.

21. The combination of claim 12, wherein the switch comprises mercury.

22. The combination of claim 12, wherein the screen is touch sensitive.

23. The combination of claim 12, comprising a computer workstation coupled to the computing device by the docking station.

\* \* \* \* \*